US006553959B2

(12) United States Patent  (10) Patent No.: US 6,553,959 B2
Xu et al.                  (45) Date of Patent:     Apr. 29, 2003

(54) ELECTRONIC FLOW CONTROL FOR A STRATIFIED EGR SYSTEM

(75) Inventors: Min Xu, Canton, MI (US); Grant Chen, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 26 days.

(21) Appl. No.: 09/879,475

(22) Filed: Jun. 11, 2001

(65) Prior Publication Data

US 2001/0050070 A1 Dec. 13, 2001

Related U.S. Application Data (60) Provisional application No. 60/211,085, filed on Jun. 13, 2000.

(51) Int. Cl.[7] ................................................. F02B 17/00
(52) U.S. Cl. ........................... 123/295; 123/302; 60/323
(58) Field of Search ......................... 123/295, 302, 123/308, 430, 568.11, 568.24, 568.26, 568.2

(56) References Cited

U.S. PATENT DOCUMENTS

| | | | |
|---|---|---|---|
| 4,393,853 A | 7/1983 | Groves | |
| 4,924,840 A | * 5/1990 | Wade | 123/568.19 |
| 5,005,552 A | 4/1991 | Kawamura | |
| 5,115,790 A | * 5/1992 | Kawamura | 123/568.2 |
| 5,524,582 A | 6/1996 | Suh et al. | |
| 5,546,915 A | 8/1996 | Isobe | |
| 5,562,085 A | * 10/1996 | Kosuda et al. | 123/198 F |
| 5,570,673 A | 11/1996 | Isobe | |
| 5,632,144 A | 5/1997 | Isobe | |
| 5,653,202 A | 8/1997 | Ma | |
| 5,765,525 A | 6/1998 | Ma | |
| 5,870,993 A | 2/1999 | Stellet et al. | |
| 5,915,354 A | 6/1999 | Ma | |
| 5,918,577 A | 7/1999 | Martelli et al. | |
| 5,974,792 A | 11/1999 | Isobe | |
| 6,053,154 A | * 4/2000 | Pott | 123/568.11 |
| 6,129,062 A | 10/2000 | Koda | |
| 6,199,522 B1 | 3/2001 | Regueiro | |
| 6,386,154 B1 | * 5/2002 | Hellman et al. | 123/568.12 |

FOREIGN PATENT DOCUMENTS

| | | |
|---|---|---|
| EP | 0488 254 A1 | 6/1992 |
| EP | 1074706 A2 | 2/2001 |
| JP | 6137223 | 5/1994 |

\* cited by examiner

*Primary Examiner*—John Kwon
(74) *Attorney, Agent, or Firm*—Brinks Hofer Gilson & Lione (57) ABSTRACT

A stratified exhaust gas re-circulation (EGR) engine uses an exhaust port per cylinder for exhausting exhaust gases and to re-circulate exhaust gas. The EGR valve may be phased from the exhaust stroke to the intake stroke. The EGR valves that control the exhaust gas re-circulation ports may be on a separate camshaft from the other valves. The EGR ports and an intake port for each of the cylinders may be helical or tangential ports that stratified the exhaust gas and the air in the cylinder. The engine may be a direct injection or a port fuel injection engine with one or more exhaust manifolds. The exhaust gas re-circulation ports may be controlled by a single flow valve or each port may have a separate flow valve. The intake ports may be controlled by a single flow valve or each intake port may have a separate flow valve.

22 Claims, 7 Drawing Sheets

ELECTRONIC FLOW CONTROL FOR A STRATIFIED EGR SYSTEM

REFERENCE TO RELATED APPLICATION

This application claims the benefit of U.S. Provisional Application No. 60/211,085, filed Jun. 13, 2000, titled "Measurement of Canister Purge Fuel Content in a Stratified Direct Injection Gasoline Engine."

BACKGROUND

This invention relates generally to the field of gasoline-based internal combustion engines and more specifically to exhaust gas re-circulation systems.

Many lean-burn internal combustion engines include an exhaust gas re-circulation ("EGR") system to address issues with nitrogen oxide ("NOx") and fuel economy. A portion of the exhaust gas from the combustion chamber is recirculated via an exhaust gas re-circulation valve ("EGR valve") back into the intake manifold to be mixed with fresh air and fuel mixture. The amount of exhaust gas to be re-circulated may be controlled by opening or closing the EGR valve.

Direct injection engines, also called "in-cylinder injection engines," inject fuel directly into the cylinders. Recently, direct injection spark ignited ("DISI") engines have been proposed. A DISI engine requires the fuel to be injected at relative high pressure. Such a DISI engine also can be operated with a leaner airfuel ratio than conventional gasoline engines.

DISI engines operate in a stratified mode or a homogenous mode. When a DISI engine is in the stratified mode, the combustion chambers contain stratified layers with different air/fuel mixtures. The strata closest to the spark plug contains a stoichiometric mixture or a slightly richer mixture, and subsequent strata contain progressively leaner mixtures. When the engine is in the homogeneous mode, a homogeneous mixture of air and fuel is injected into the combustion chamber. Homogeneous operation may be either lean of stoichiometry, at stoichiometry, or rich of stoichiometry.

When a DISI engine operates in the stratified mode, the fuel is injected late in the compression cycle, usually during a compression stroke. Because of the late injection, a very short time is available for mixing of the air and fuel in the cylinder. Because of the short mixing time, the fuel in the rich zone passes the spark plug during ignition. Stable combustion is obtained because the rich zone air/fuel mixture near the spark plug is within the ignition limits while the overall air/fuel mixture in the cylinder is leaner than the air/fuel mixture normally used when the engine is in the homogeneous mode. When the engine is in the homogeneous mode, fuel is injected during an intake stroke of the engine. More mixing occurs in the homogenous mode then in the stratified mode. The stratified combustion mode is more fuel efficient than the homogenous mode due to pumping loss reduction. The stratified mode may be used for light to medium loads and the homogeneous mode may be used for medium to heavy loads.

Direct injection engines are commonly coupled to three-way catalytic converters to reduce CO, HC, and NOx emissions. When operating at air/fuel mixtures lean of stoichiometry, an NOx trap or an NOx catalyst is typically coupled downstream of the three-way catalytic converter to further reduce NOx emissions.

An engine with an exhaust gas re-circulation system my operate in a homogeneous mode or a stratified mode. In the homogeneous mode, the cylinders are filled with a homogeneous air/fuel mixture. In the homogeneous mode with exhaust gas re-circulation, the cylinders are filled with a homogeneous mixture of air/fuel and exhaust gas. In a stratified mode, also called the stratified exhaust gas re-circulation mode or the SEGR mode, the cylinders are filled with a stratified mixture of air/fuel and exhaust gas.

SUMMARY

An improved stratified exhaust gas re-circulation engine includes an exhaust gas re-circulation port that can be used as an exhaust gas port or an exhaust gas re-circulation port. The re-circulation valves that control the exhaust gas re-circulation ports may be on a separate camshaft from the intake valves and the exhaust valves. The exhaust gas re-circulation ports may be helical or tangential ports. The exhaust gas and the air may be radially stratified, such that the exhaust gas is circulated around the air in the cylinders. One or more of the intake ports for each cylinder may be a helical or tangential port that circulates the air within the circling exhaust gas. The engine may be a direct injection or a port fuel injection engine with one or more exhaust manifolds.

In another embodiment of the engine, the engine uses a flow valve to control the exhaust gas re-circulation, while the re-circulation valve for the exhaust gas re-circulation port is driven by a different cam shaft as the intake and exhaust valves. The engine may use an intake flow valve(s) to control the air intake. In a five valve embodiment of the engine, the engine includes two intake valves, two exhaust valves, and a re-circulation valve.

The foregoing discussion has been provided only by way of introduction. Nothing in this section should be taken as a limitation on the following claims, which define the scope of the invention.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

A. Definitions

AFR—Air-to-Fuel Ratio. The air-to-fuel ratio may be determined as the mass of air divided by the mass of fuel.

BDC—Bottom Dead Center
DI—Direct Injection
DISI—Direct Injection Spark Ignition
DOHC—Dual Overhead Cam
EFC—Electronic Flow Control
EG—Exhaust Gas
EGR—Exhaust Gas Re-circulation
MAP—Manifold Absolute Pressure
PCV—Positive Crankcase Ventilation
PFI—Port Fuel Injection
SEGR—Stratified Exhaust Gas Re-circulation
SI—Spark Ignited
SOHC—Single Overhead Cam
Stoichiometric combustion—Combustion in which the fuel is substantially completely burned.
Swirl port—a port, normally an intake port, that can create a swirl in the combustion chamber. The axis of rotation of the swirl is normally parallel to the axis of the combustion chamber. A swirl port may be a tangential swirl port, a helical swirl port, or other swirl port configuration.
TDC—Top Dead Center
TWC—Three-Way Catalyst or Three-Way Catalytic converter
UEGO—Universal Exhaust Gas Oxygen B. Introduction The improved system and method of controlling an exhaust gas re-circulation system for an internal combustion engine includes using a phaseable camshaft to control exhaust gas re-circulation valves. The phaseable camshaft allows the exhaust gas re-circulation valves to be used as either exhaust valves or exhaust gas re-circulation valves. Flow valves in the intake manifold and the exhaust manifold are electronically controllable to allow SEGR stoichiometric combustion.

C. Direct Injection System

Figure 1:
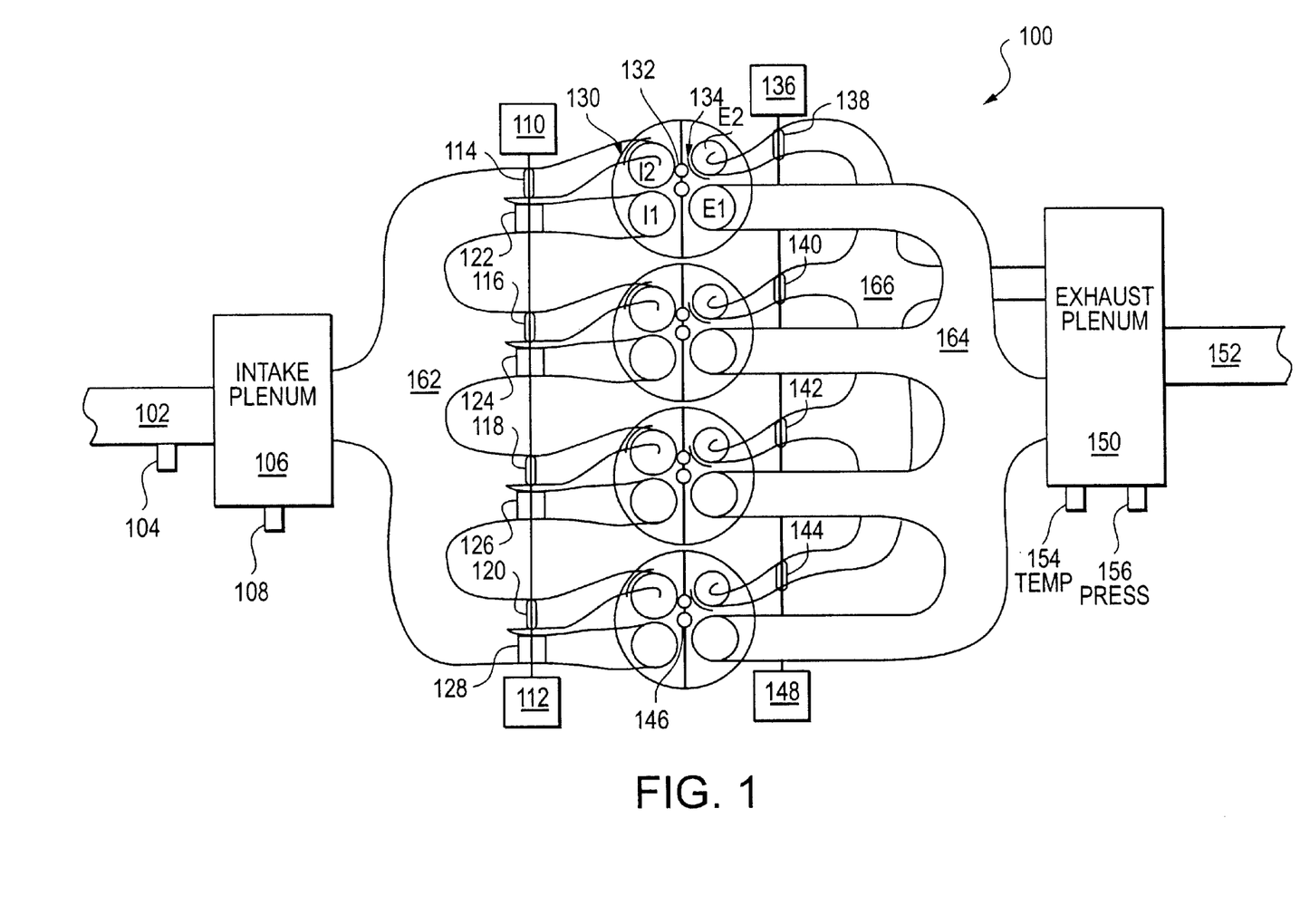
FIG. 1 is a schematic diagram of one embodiment of an engine with an electronic flow control system.

FIG. 1 is a schematic diagram of an engine 100 with an exhaust gas re-circulation system. The engine 100 may be a direct injection or a port fuel injection internal combustion engine. The engine 100 may include any number of cylinders, including 3, 4, 6, 8, 10, or other number of cylinders. The engine 100 may be in any configure, including an inline four cylinder configuration as illustrated in FIG. 1, a "V" configuration, such as a V-6 or a V-8, or other type of engine.

The air intake system of the engine 100 provides air to the combustion chambers, that is the portions of the cylinders where combustion occurs. The air intake system may include such components as: an intake pipe 102, a mass flow sensor 104, a intake plenum 106, a MAP sensor 108, an intake manifold 162, an air EFC actuator 110, and an EFC valve position sensor 112. The intake manifold 162 may include one or more flow control valves for each cylinder. For example, in FIG. 1, the intake manifold includes an EFC valve 114, 116, 118, and 120 and a port deactivation valve 122, 124, 126, and 128 for each cylinder.

The exhaust system of the engine 100 may include, an exhaust gas EFC actuator 136, an exhaust gas EFC valve position sensor 148, an exhaust plenum 150, an exhaust gas temperature sensor 154, an exhaust gas pressure sensor 156, and an exhaust pipe 152. The exhaust gas re-circulation manifold 166 may include an exhaust gas re-circulation EFC valve 138, 140, 142, and 144 for each cylinder. The exhaust system may also include such devices as a three-way-converter (TWC) (not shown), such as a quick light-off TWC, and a muffler (not shown).

Each cylinder in the engine 100 may include a spark plug 132, a fuel injector 146, intake ports I1 and I2 with intake valves, and exhaust ports E1 and E2 with exhaust valves. The second exhaust port E2 is also called the exhaust gas re-circulation port. The exhaust gas re-circulation port E2 may be used as an exhaust port or as an exhaust gas re-circulation port. Each cylinder may include more or fewer ports than shown in FIG. 1. For example, each cylinder may include two intake ports, two dedicated exhaust ports, and a dedicated exhaust gas re-circulation port. The intake valves, the exhaust valves, and the re-circulation valves are controlled by one or more camshafts. An intake port I2 and the exhaust gas re-circulation port E2 may be designed such that the air and the exhaust gas are stratified in the combustion chambers.

The fuel injector 146 may be a direct injection fuel injector located near the center of the cylinder 131. The spark plug 132 should be located near the injector 146. Preferably, the spark plug 132 is also located between the second intake port I2 and the exhaust gas re-circulation port E2. Alternatively, an integrated fuel injector and igniter may be used in place of the fuel injector 146 and spark plug 132. Multiple injectors 146 and multiple spark plugs 132 per cylinder may also be used. The fuel injector 146 shown in FIG. 1 is a direct injection injector, however, port fuel injectors may also be used.

D. Engine Operation

The engine 100 may be operated in the normal mode or the SEGR mode. When the engine 100 is operated at partial loads, the engine may be in the SEGR mode. Partial loads may be from an idle load to and including a normal cruising speed load. When the engine 100 is in the SEGR mode, pumping losses are reduced and fuel economy is improved. In the SEGR mode, air is drawn into the cylinders by the moving piston during the intake stroke. Fuel is injected into the air to form a homogeneous stoichiometric air/fuel mixture. The air mass flow rate and the manifold absolute pressure ("MAP") are detected by the mass flow sensor 104 and the MAP sensor 108. The flow valves 114, 116, 118, and 120 are partially open to regulate the amount of air through the helical intake ports I2 for the required load to maintain a stoichiometric mixture. The straight intake ports I1 are deactivated by the flow control valves, also called deactivation valves, 122, 124, 126, and 128. The port deactivation valves 122, 124, 126, and 128 may include a butterfly valve, a rotary valve, or other type of valve. The required air quantity is less than the cylinder volume, exhaust gas is introduced into the cylinders to avoid significant pumping loss. To introduce exhaust gas into the cylinders, the exhaust valves of the second exhaust port E2 are phased to the intake stroke, that is 180 degrees crank angle. Thus, both the second intake ports I2 and exhaust gas re-circulation ports E2 are intake ports. Exhaust gases from the exhaust plenum 150 are regulated by the exhaust gas EFC valves 138, 140, 142, and 144. The exhaust gas EFC valves 138, 140, 142, and 144 may be controlled as a function of information provided by the air mass sensor 104, the MAP sensor 108, the exhaust gas temperature sensor 154, the exhaust gas pressure sensor 156, and the intake and re-circulation EFC valve position sensors 112 and 148. The openings of the air EFC valves 114, 116, 118, and 120 and exhaust gas EFC valves 138, 140, 142, and 144, are optimized to achieve an adequate in-cylinder EGR rate for the engine load, while ensuring stable combustion, acceptable emissions levels, and minimal pumping loss.

The intake helical port I2 generates swirling air motion in the cylinders. The intake mask 130 is located on the engine head and blocks the airflow towards the cylinder wall. Hence, a swirling air flow is generated at the center of the cylinder. The intake mask 130 may be located near the wall along partial valve seat edge and may be adjustable. The re-circulation port E2 includes a mask 134 that is aimed to obtain larger tangential velocities of the exhaust gas flow nearer the cylinder wall and blocks exhaust gas flow towards the center of the cylinder. Thus, the air swirls nearer the center of the cylinder and the exhaust gas swirls around the swirling air in the same direction and at a similar rate. It is preferred that the mixing between the air flow and the exhaust gas flow are minimized.

The exhaust port E1 is the primary port for expelling the exhaust gas. The exhaust port E1 may have a much larger size and less flow restriction in the exhaust manifold. The re-circulation port E2 may be smaller than the exhaust port E1. The re-circulation port E2 may be located near the cylinder wall. The re-circulation port E2 is sized to provide sufficient exhaust gas for the SEGR mode. The spark plug can be positioned between this valve and the injector. The exhaust ports E1 and E2 from each cylinder are connected to two separate exhaust manifolds, then to an exhaust plenum. The E1 manifold and plenum are tuned and designed to suppress the pressure pulsation and temperature fluctuation resulted from intermittent exhaust events. The E2 manifold can be treated separately (cooled or heated) for temperature control if necessary. The exhaust plenum 150 can optionally be divided into two sub-chambers to reduce the influence between the exhaust of E1 and the intake of E2.

While FIG. 1 illustrates an inline four cylinder, other engine configurations could also be used. An alternative to the valve layout shown in FIG. 1 is described below in reference to FIG. 7. For example, a single valve 724 in the exhaust gas re-circulation manifold 766 could be used instead of a separate valve for each exhaust gas re-circulation port. The physical layout of the exhaust gas re-circulation manifold 766 could be used to ensure the appropriate amount of exhaust gas enters each cylinder. Similarly, the intake manifolds 760 and 762 may have a single flow control valve 719 and a single de-activation valve 716, respectively.

E. Flow Control Valves

Figure 2:
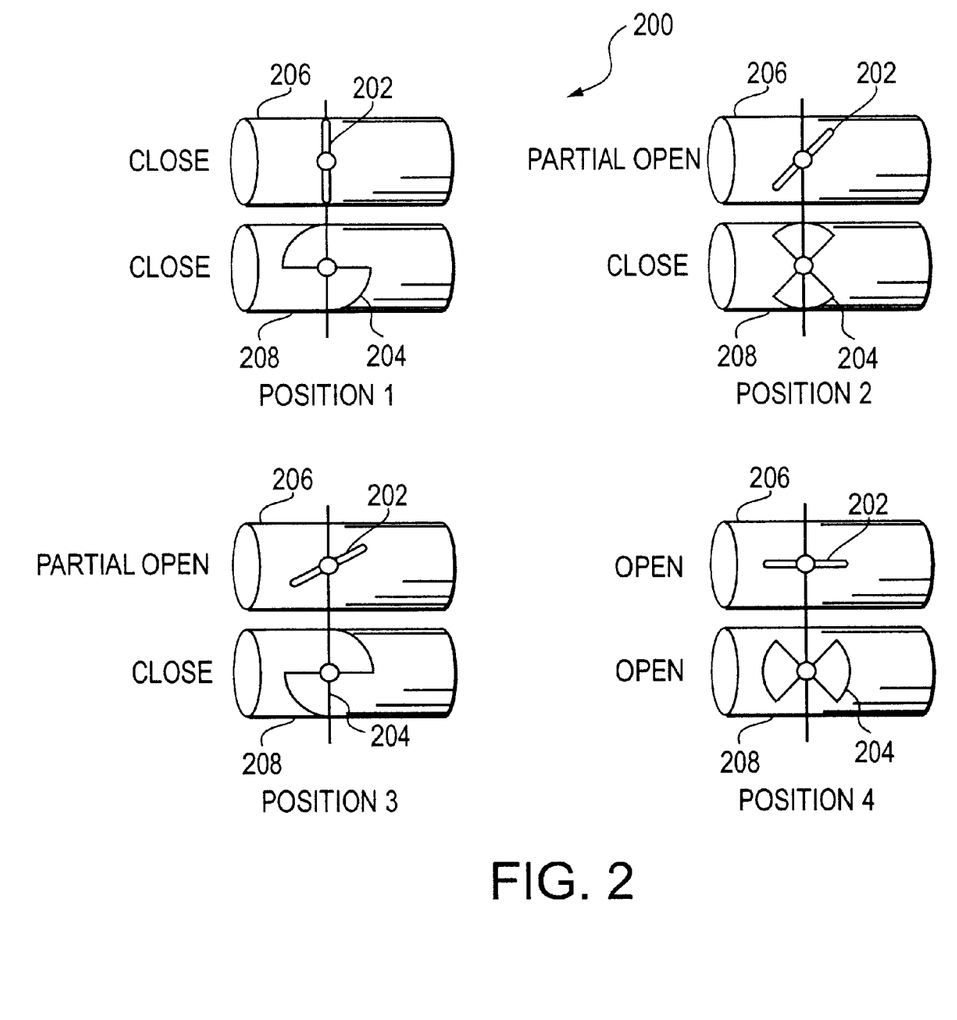
FIG. 2 is a set of schematic diagrams of one embodiment of the positions of the EFC valves of the engine with an electronic flow control system.
Figure 7:
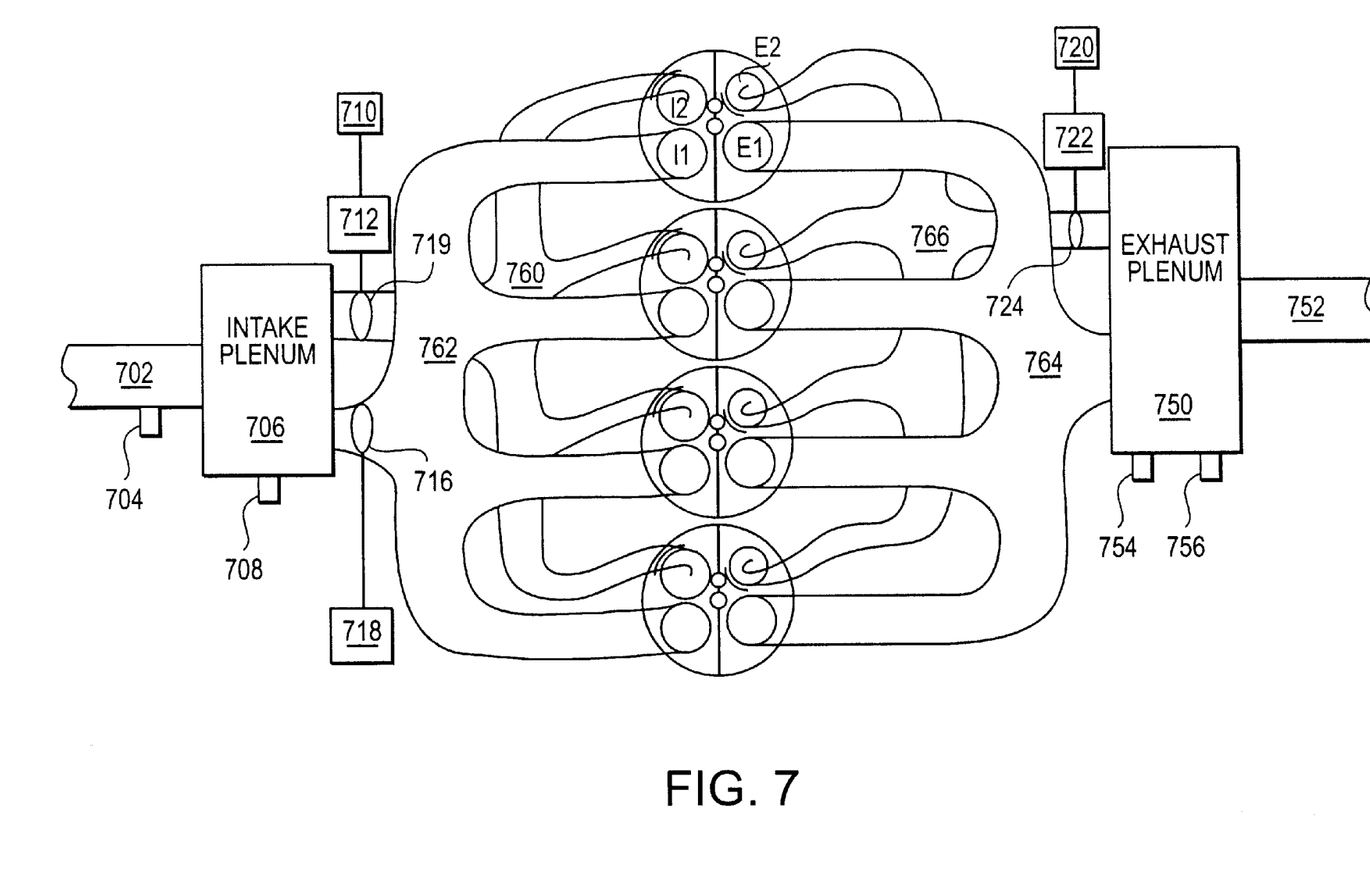
FIG. 7 is a schematic diagram of a second embodiment of an engine with an electronic flow control system.

FIG. 2 is a set of schematic diagrams of the positions of an intake flow valve 202 (for example, the intake EFC valve 114 of FIG. 1 or EFC valve 719 of FIG. 7) and a deactivation valve 204 (for example, port deactivation valve 122 of FIG. 1 or deactivation valve 716 of FIG. 7). The engine 100 (FIG. 1) may include an intake flow valve 202 and a deactivation valve 204 for each cylinder. The deactivation valve 204 is a butterfly valve that can be driven by the same valve actuator as the flow valve 202, such that the deactivation valve 204 is closed when the flow valve 202 is closed or partially opened and the deactivation valve 204 is open when the flow valve 202 is fully open.

When the engine 100 is in the SEGR mode, the intake valves may move between position 1, position 2, and position 3. In position 1, the intake flow valve 202 and the deactivation valve 204 are closed. In position 2, the intake flow valve 202 is partially open and the deactivation valve 204 is closed. In position 3, the intake EFC valve 202 is open wider than in position 2 and the deactivation valve 204 is closed.

The intake valves 202 and 204 may be controlled electronically as describe in reference to FIGS. 1 and 7. The intake valves 202 and 204 may be located in the intake manifold 162 (FIG. 1). The air flow rate gradually increases as the intake flow valve 202 moves from position 1 to position 3. The intake flow valve 202 and the deactivation valve 204 are rotated by the same amount as the valves 202 and 204 are moved between positions 1, 2, and 3.

As the intake valves 202 and 204 move from position 3 to position 4, the deactivation valve 204 opens. In position 4, the intake flow valve 202 is open and the deactivation valve 204 is open. The air flow rate is maximized in position 4. A stop may be used to prevent the intake flow valve 202 from rotating beyond horizontal. The angle of the deactivation valve 204 depends on the SEGR operating range, that is the air quantity required for the load.

Figure 3:
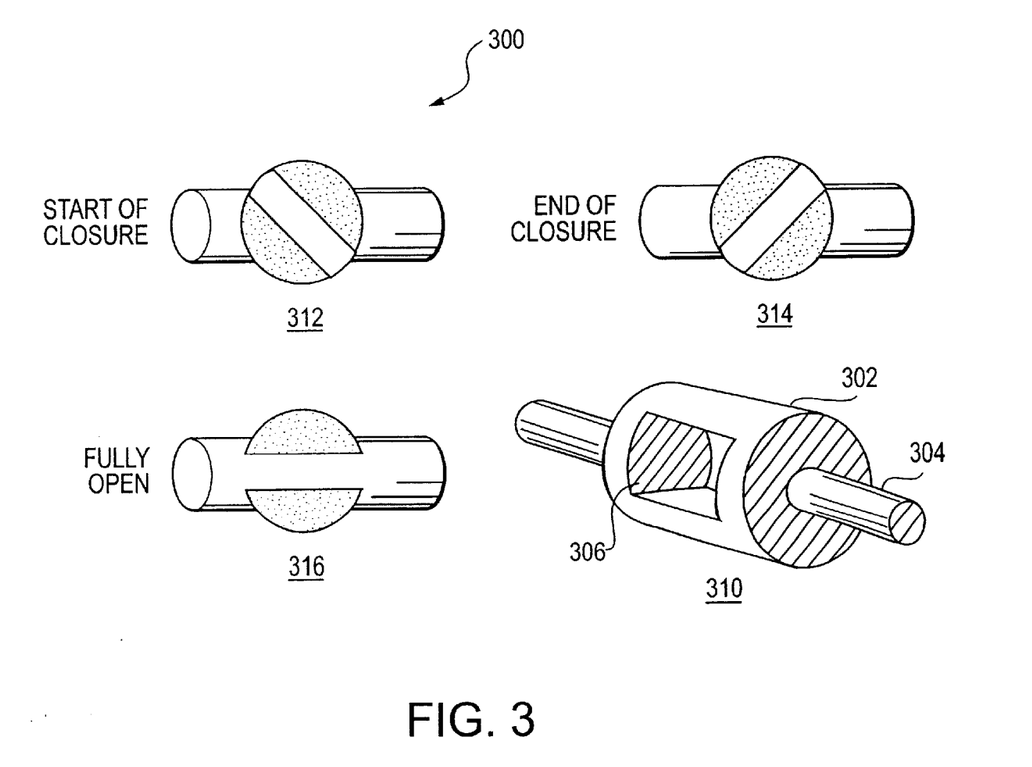
FIG. 3 is a set of schematic diagrams of one embodiment of the positions of an optional rotary valve.

Alternatives to the butterfly design for the deactivation valve 204 may also be used. FIG. 3 is a set of schematic diagrams 300 of the positions of the rotary valve 310 of the engine 100 (FIG. 1) with an electronic flow control system. When the butterfly design for the deactivation valve 204 (FIG. 2) is fully open, a significant portion of the flow passage 208 is still blocked. As the port diameter is increased, the size of the butterfly design for the deactivation valve 204 may need to be increased accordingly. Air flow around the deactivation valve 204 may be turbulent and undesirable eddies may be formed. An alternative to the deactivation valve 204 is the rotary valve 310. Various shapes can be used for the rotary valve 310 including a ball shape and a cylinder. The rotary valve 310 may provide a relatively larger deactivation period and minimum flow resistance when the rotary valve 310 is fully open than a butterfly valve. The diameter of the rotary valve cylinder 302, the opening 306 and the shaft 304 depend on the desired SEGR range and the dimensions of the intake manifold 162. The rotary valve 310 in position 312 may correspond to position 1 (FIG. 2). The rotary valve 310 between positions 312 and 314 may correspond to positions 1 and 3 (FIG. 2). The rotary valve 310 in position 316 may correspond to position 4 (FIG. 2). Other alternatives to the butterfly valve 204 (FIG. 2) and the rotary valve 310 can also be used.

F. Lift Profiles

Figure 4:
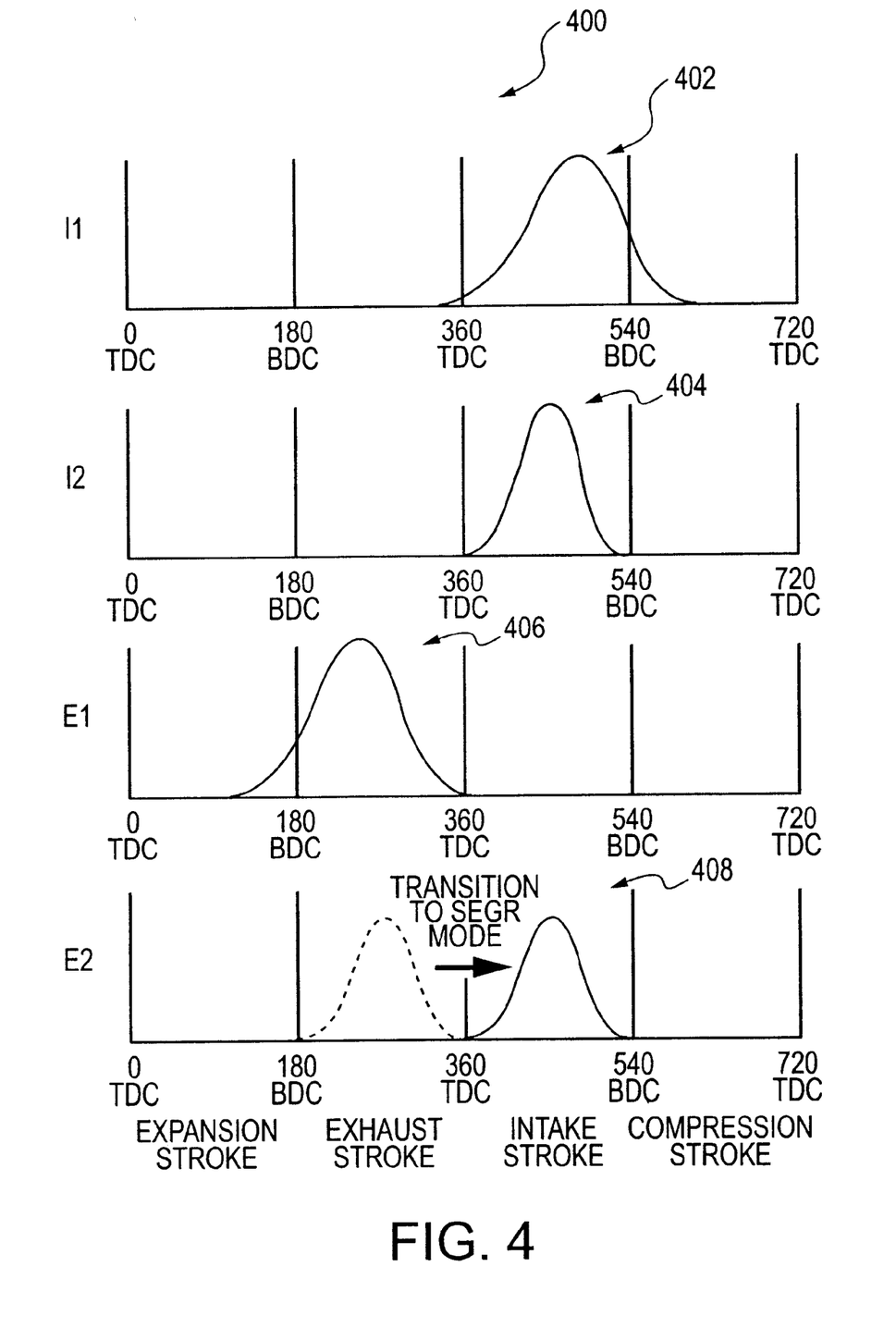
FIG. 4 is a set of diagrams showing the lift profiles of the various valves of the engine with an electronic flow control system.

FIG. 4 is a set of diagrams 400 showing the lift profiles 402, 404, 406, and 408 of the intake and exhaust valves of the engine 100 (FIG. 1) with an electronic flow control system. The engine 100 may use a valvetrain system similar to existing systems for the intake valves and the exhaust valves. The first and second intake valves for intake port I1 and I2 (FIG. 1) and the first exhaust valve for exhaust port E1 (FIG. 1) may be driven by a single camshaft, two camshafts, or more. For example, a conventional SOHC with a rocker arm may be used for the valves for ports I1, I2, and E1. The engine valves, including the intake valves and exhaust valves, may be conventional poppet valves. The second exhaust valve for the re-circulation port E2 (FIG. 1) may be driven by a phaseable camshaft. The phaseable camshaft may be an adjustable camshaft that can phase the exhaust valves for the second exhaust port between the exhaust stroke and the intake stroke. The re-circulation valve for the re-circulation port E2 may be used as an exhaust valve or a re-circulation valve depending on the phase of the second camshaft. The valves and port sizes may be determined to allow for the maximally required air and exhaust gas flow over the SEGR operating range.

Lift profile 402 illustrates the lift profile of the first intake valve for port I1. The first intake valve for port I1 closes during the compression stroke. The first intake valve for port I1 may be closed using inertia ramming from the intake air flow when the engine 100 (FIG. 1) is operated at high speed and high load conditions. The back flow through the first intake valve I1 at high load and low-mid speed conditions should be within acceptable limits. The first intake valve for port I1 may have little or no effect on the engine performance when the engine 100 is in the SEGR mode, that is at low-mid speed and low to medium loads, because the port is deactivated by a deactivation valve 122 (FIG. 1).

Lift profile 406 illustrates that the exhaust valve for the exhaust port E1 opens early in expansion stroke to allow blow down. The exhaust valve for the exhaust port E1 closes approximately when the cylinder reaches top-dead-center ("TDC") to avoid interfering with the SEGR flow.

Lift profiles 404 and 408 illustrates that the intake valve for the intake port I2 and re-circulation port E2 (the swirl ports) may open simultaneously during the intake stroke for air and exhaust gas re-circulation, respectively. Exhaust gas re-circulation is also called exhaust gas induction. As illustrated by the arrow indicating a transition to SEGR mode in lift profile 408, the exhaust valve for the re-circulation port E2 may be phased to the exhaust stroke when the engine is in the normal mode, that is when the engine is not in the SGER mode. The valve for the re-circulation port E2 may be gradually phased to adjust the overlap period with valves for the intake ports I1 and I2 to assure adequate internal EGR in the normal mode. The dashed curve in the lift profile 408 illustrates that the re-circulation valve is open during the exhaust stroke when the engine is in the normal mode. When the engine is in the SEGR mode, the air intake valve for port I2 and exhaust gas re-circulation valve for port E2 begin to open simultaneously when the engine reaches TDC and close simultaneously when the engine reaches BDC. The air and exhaust gas flow rates may be separately controlled by different flow valve actuators 112 and 148 (FIG. 1). The air and fuel quantities and the amount of exhaust gas may be determined based on the required load.

Figure 5:
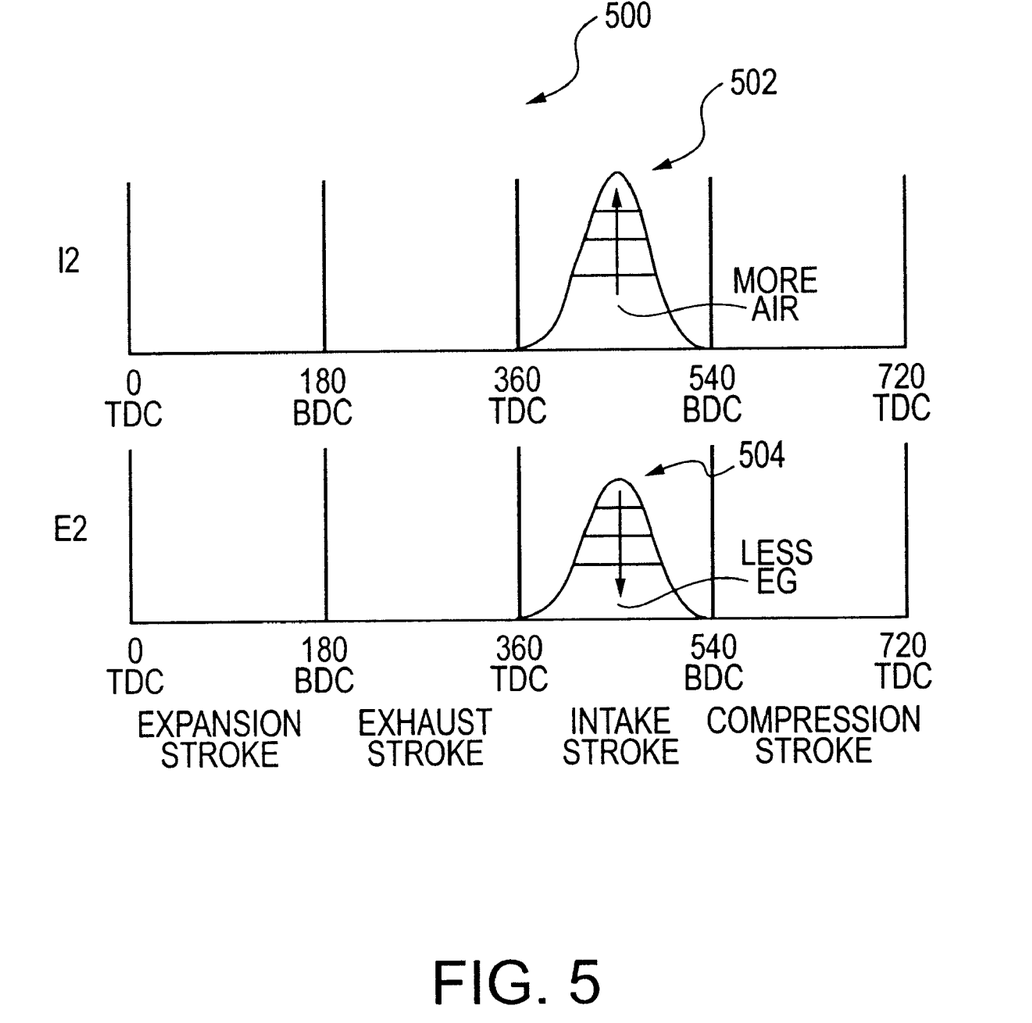
FIG. 5 is a diagram showing effective flow areas for the air and the exhaust gas.

FIG. 5 is a diagram 500 illustrating the effective flow areas for the air intake into the second intake port I2 and the exhaust gas intake into the re-circulation port E2 when the engine is in the SEGR mode. Since the volume of the cylinder remains constant, when more air 502 is introduced into the cylinder less exhaust gas 504 is introduced. The reverse is also true, when less air is introduced into the cylinder more exhaust gas is introduced. During the initial stage of the intake stroke, the air and exhaust gas flow rates are regulated by the engine valves for the swirl ports I2 and E2. The engine valves directly cover the ports and may be poppet valves. As the piston moves toward the halfway point of the stroke, the effective flow area is determined by the intake flow valves 114, 116, 118, and 120 (FIG. 1) opening because the intake flow valve becomes the most restrictive point.

The speed of the piston reaches zero at top-dead-center ("TDC") and bottom-dead-center ("BDC"). The speed of the piston reaches a maximum at the halfway point of the stroke. Since the induction of the exhaust gas is driven by the moving piston, the initial and end ramps of the flow area coincide with the low piston speeds and are insensitive to the engine speed. The small flow area shown in profiles 502 and 504 during valve opening are suitable for the initial formation of the SEGR flow pattern. The main air and exhaust gas flows are introduced into the cylinder during the middle of the intake stroke, when both the piston speed and flow area near their limits. The air intake flow valves 114, 116, 118, and 120 are used to control the air mass for the engine load, while the exhaust gas flow valves 138, 140, 142, and 144 (FIG. 1) are used to control the in-cylinder EGR rate.

G. Modes of Operation

Figure 6:
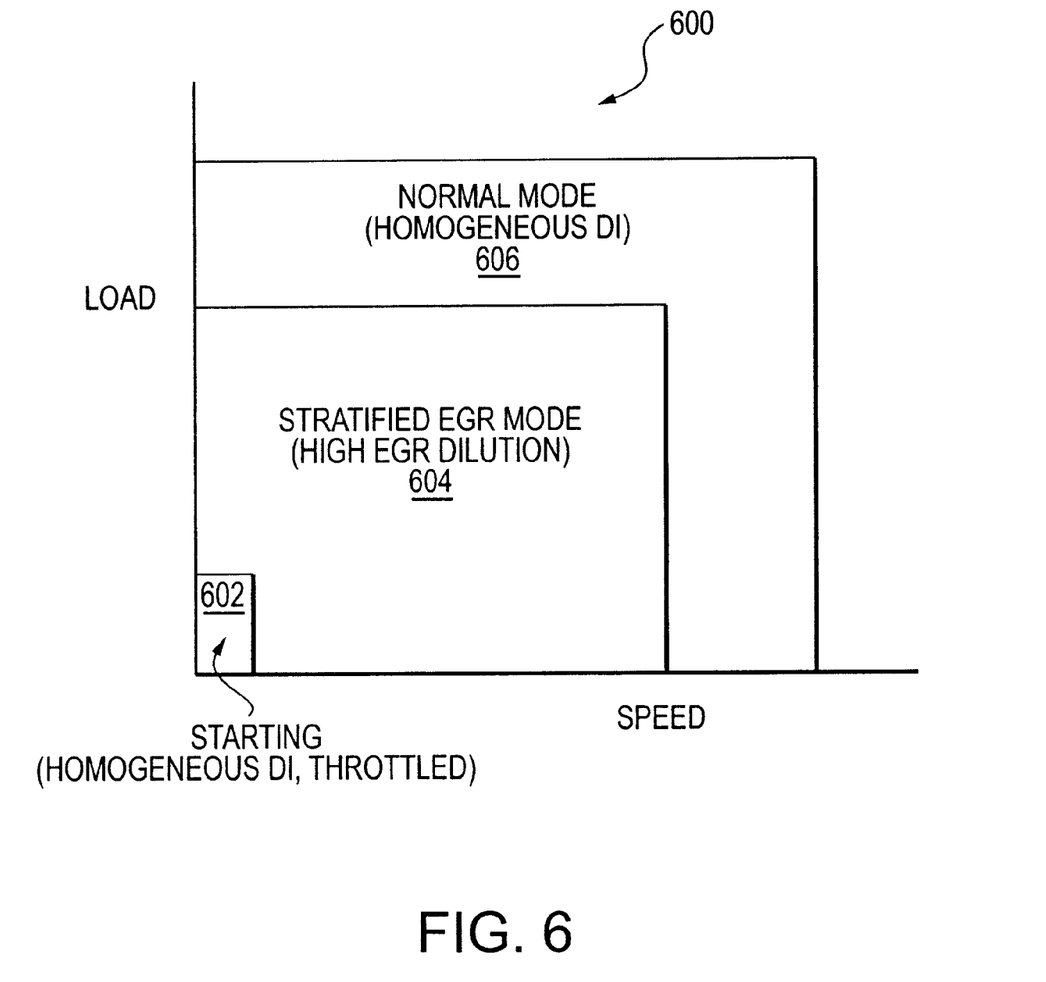
FIG. 6 is a diagram showing one embodiment of operating modes of the engine with an electronic flow control system.

FIG. 6 illustrates a diagram 600 of the main operating modes of the engine 100 (FIG. 1) with an electronic flow control system. The three operating modes illustrated in FIG. 6 include a starting mode region 602, a stratified EGR mode region 604, and a normal mode region 606.

When the engine 100 is started, either a cold and warm start, the engine operates in the starting mode region 602, also called the homogeneous direct injection throttled mode. In the starting mode, the intake de-activation valve 122 (FIG. 1) for straight port I1 is deactivated, the air flow valve 114 (FIG. 1) is opened slightly to throttle the air through the second intake port I2, and the re-circulation E2 port is deactivated by the re-circulation valve 138 (FIG. 1). The engine 100 operated in the starting mode region 602 may have a substantial pumping loss caused by throttling by the air flow valve 114. This pumping loss may be similar to the loss in traditional PFI engines. The strong air swirl motion generated by the intake port I2, the intake swirl port, improves air-fuel mixing and turbulence in the cylinder resulting in improved combustion. Having only one exhaust port, the exhaust port E1, open reduces heat loss from the exhaust gas to the exterior wall, therefore, the catalyst heats up faster and the catalyst light-off occurs faster.

The engine 100 operates in the stratified EGR mode region 604, also called the high EGR dilution region, during low to medium speed and load conditions, including idling. The SEGR mode improves fuel economy due to the significant pumping loss reduction. The first intake port I1 is deactivated when the engine is in the SEGR mode. The second intake port I2 and the re-circulation port E2 are intake ports for air intake and exhaust gas induction, respectively. The exhaust port E1 is used as an exhaust port. In the stratified EGR mode, a stoichiometric homogeneous charge of air and fuel is circulated in the center of the cylinder with exhaust gas circulating around the air and fuel. The stoichiometric homogeneous charge of air and fuel is combusted. Little or no chemical reaction occurs in the outer EGR area.

When the engine operates in the SEGR mode 604, the fuel vapor in the charcoal canister and the PCV system can be purged by temporarily entering the throttling mode 602. When the engine enters the temporarily throttling mode 602, the air flow valve 114 (FIG. 1) is partially opened, but the exhaust gas flow valve 138 (FIG. 1) is completely closed. Thus, the cylinder, the second intake port I2 and the area downstream of the intake flow valve 114 become a vacuum. The fuel vapor is then drawn into the cylinder via the second intake port I2. The fuel vapor purging can be applied to one cylinder while the other cylinders intake pure air. Alternatively, the fuel vapors may be purged into some or all of the cylinders.

The engine 100 operates in the normal mode region 606, also called the homogeneous direct injection mode, when the load and speed is increased. In the normal mode, all four ports, I1, I2, E1, and E2 are used. The intake ports I1 and I2 are used for air intake and exhaust port E1 and the re-circulation port E2 are used as exhaust ports. The combined effect of the air swirl motion from the second intake port I2 and the tumble motion from first intake port I1 results in a better mixing that improves combustion in the cylinder. The adjustable overlap between the engine valves for intake ports I1 and I2 and the exhaust valve for the exhaust port E2 can blend in the adequate amount of internal EGR for NOx reduction. The charge cooling effect can improve engine power/torque, fuel economy, and knock tolerance. As a result, the compression ratio may be increased, for example to 12.5.

H. Alternative Embodiments

FIG. 7 is a schematic diagram of a second embodiment of an engine 700 with an electronic flow control system. The engine 700 includes optional components that may result in a simpler and lower cost engine. The intake flow valves 114, 116, 118, and 120 of the engine 100 of FIG. 1 are replaced with a a second intake flow valve 719. The deactivation valves 122, 124, 126, and 128 of FIG. 1 are replaced with the first intake flow valve 716. The reduction in the number of intake flow valves is achieved in part by replacing the intake manifold 162 (FIG. 1) with two intake manifolds 760 and 762. Likewise, the re-circulation valves 138, 140, 142, and 144 (FIG. 1) can be replaced with the re-circulation valve 724. The first and second intake valves 716 and 719 provide flow control for all the cylinders, rather than having separate flow control for each cylinder. The intake flow valves 719 and 716 may include conventional throttle plate valves. The valve actuators 712 and 718 independently control the position of the intake flow valves 719 and 716. An optional intake valve position sensor 710 provides information about the position of the flow valve 719 to an engine control systems. Likewise the exhaust gas re-circulation flow valve 724, for example a flap valve, is controlled by a valve actuator 722. An optional exhaust gas re-circulation valve position sensor 720 provides information about the position of the intake flow valve 719 to an engine control systems.

As a person skilled in the art will recognize from the previous description and from the figures and claims, modifications and changes can be made to the preferred embodiments of the invention without departing from the scope of the invention defined in the following claims.

What is claimed is:

1. An engine control system for a multi-port direct injection engine, comprising:
   a first camshaft having cam mechanisms that control first and second intake valves and a first exhaust valve for each of a plurality of cylinders; and
   a second camshaft having cam mechanisms that control a second exhaust valve for each of the plurality of cylinders;
   wherein the second camshaft is capable of phasing the second exhaust valve between an exhaust stroke and an intake stroke;
   wherein exhaust gases from the plurality of cylinders enter an exhaust manifold via the second exhaust valves when the second exhaust valves are phased with the exhaust stroke and exhaust gases from the exhaust manifold enters the plurality of cylinders via the second exhaust valves when the second exhaust valves are phased with the intake stroke; and
   wherein the second exhaust valves control exhaust gas flow to and from the plurality of cylinders via tangential exhaust gas ports.

2. The system of claim 1, wherein the second intake valves control air intake into the plurality of cylinders via tangential intake ports;
   wherein the tangential intake ports circulate air in the plurality of cylinders and the tangential exhaust gas ports circulate exhaust gases around the circulating air in the plurality of cylinders.

3. An engine control system for a multi-port direct injection engine, comprising:
   a first camshaft having cam mechanisms that control first and second intake valves and a first exhaust valve for each of a plurality of cylinders; and
   a second camshaft having cam mechanisms that control a second exhaust valve for each of the plurality of cylinders;
   wherein the second camshaft is capable of phasing the second exhaust valve between an exhaust stroke and an intake stroke;
   wherein exhaust gases from the plurality of cylinders enter an exhaust manifold via the second exhaust valves when the second exhaust valves are phased with the exhaust stroke and exhaust gases from the exhaust manifold enters the plurality of cylinders via the second exhaust valves when the second exhaust valves are phased with the intake stroke; and
   wherein the second exhaust valves control exhaust gas glow to and from the plurality of cylinders via helical swirl exhaust gas ports.

4. The system of claim 3, wherein the second intake valves control air intake into the plurality of cylinders via helical swirl intake ports;
   wherein the helical swirl intake ports circulate air in the plurality of cylinders and the helical swirl exhaust gas ports circulate exhaust gases around the circulating air in the plurality of cylinders.

5. The system of claim 4, further comprising:
   an air intake deflector for each cylinder that guides an air-fuel mixture into a center region of each of the plurality of cylinders via the helical swirl intake ports; and
   an exhaust gas deflector for each cylinder that guides exhaust gases into an outer region the plurality of cylinders via the helical swirl exhaust gas ports,
   wherein the outer region encircles the center region,
   wherein the exhaust gas and the air-fuel mixture rotate in each cylinders in the same direction and at substantially similar rates of rotations.

6. The system of claim 5, wherein the first exhaust valve exhausts gas into a first exhaust manifold and the second exhaust valve exhausts gas into a second exhaust manifold.

7. The system of claim 6, further comprising an intake manifold that comprises an electronic intake flow valve for each cylinder that controls air flow into each of the plurality of cylinders via the helical swirl intake ports.

8. The system of claim 7, wherein the second exhaust manifold comprises an electronic exhaust gas flow valve that controls exhaust gas flow into each of the plurality of cylinders via the helical swirl exhaust gas ports.

9. The system of claim 8, wherein the intake manifold further comprises a electronic valve actuator that controls the electronic intake flow valves.

10. The system of claim 8, wherein the intake manifold further comprises a port de-activation valve for each cylinder that controls air flow into each of the plurality of cylinders via the first intake ports.

11. The system of claim 10, wherein the port de-activation valves each comprise a butterfly valve.

12. The system of claim 10, wherein the port de-activation valves each comprise a rotary valve.

13. The system of claim 10, further comprising:
    an electronic intake valve actuator that controls the intake flow valves; and
    an intake flow valve position sensor that provides indications of positions of the port de-activation valves and the electronic intake flow valves.

14. The system of claim 13, further comprising:
    a first exhaust manifold that receives exhaust gas from the cylinders via the straight exhaust gas ports; and
    a second exhaust manifold that receives exhaust gas from the cylinders via the helical swirl exhaust gas ports.

15. The system of claim 14, further comprising:
    an exhaust plenum that receives exhaust gas from the first and second exhaust manifolds.

16. The system of claim 15, further comprising:
an ignition device for each cylinder located between the helical swirl intake port and the helical swirl exhaust gas port on each cylinder.

17. The system of claim 16, wherein the ignition device comprises an integrated fuel injector and igniter.

18. A direct injection spark initiated internal combustion engine having a plurality of cylinders, where each cylinder comprises a first and second intake port and first and second exhaust ports, the engine comprising:
a first intake manifold that comprises a first flow valve that controls the air flow into the first intake ports;
a second intake manifold that comprises a second flow valve that controls the air flow into the second intake ports;
a first exhaust gas manifold that receives exhaust gas from the cylinders via the first exhaust ports;
a camshaft that can phase an exhaust valve for each of the second exhaust ports from an intake stoke to an exhaust stroke; and
a second exhaust gas manifold that receives exhaust gas from the cylinders via the second exhaust ports when the exhaust valves are phased with the exhaust stroke, wherein the second exhaust gas manifold comprises a third flow valve that controls the exhaust gas flow into the cylinders via the second exhaust ports when the exhaust valves are phased with the intake stroke.

19. The engine of claim 18, wherein the second intake ports comprise helical intake ports and the second exhaust ports comprise helical exhaust gas intake ports.

20. The engine of claim 19, wherein the engine is a radially stratified exhaust gas re-circulation engine.

21. A spark initiated internal combustion engine, comprising:
a plurality of cylinders that each comprise first and second intake ports and first and second exhaust ports;
a camshaft that controls an exhaust gas re-circulation valve for each of the second exhaust ports, wherein the camshaft can phase the exhaust gas re-circulation valves from an intake stroke to an exhaust stroke; and
an intake flow valve for each cylinder that controls air flow into the cylinders via the second intake ports and an exhaust gas re-circulation valve that controls exhaust gas flow into the cylinders via the second exhaust ports;
wherein the exhaust gas re-circulation valves allow exhaust gas to enter the cylinders via the second exhaust port when the camshaft is phased with the intake stroke and allow exhaust gas to escape from the cylinders when the camshaft is phased with the intake stroke; and
wherein the intake flow valves and exhaust gas re-circulation valves are adjusted to fill each cylinder with a combination of air and exhaust gas.

22. The engine of claim 21, wherein the combination of air and exhaust gas in the cylinders comprises more exhaust gas and less air when the engine is operated at lighter loads.

* * * * *